United States Patent
Boerner et al.

(10) Patent No.: US 6,903,851 B2
(45) Date of Patent: Jun. 7, 2005

(54) METHOD FOR PRODUCING LIGHT SCATTERING ELEMENTS

(75) Inventors: Volkmar Boerner, Freiburg (DE); Andreas Gombert, Freiburg (DE); Benedikt Bläsi, Freiburg (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 10/467,415
(22) PCT Filed: Jan. 11, 2002
(86) PCT No.: PCT/DE02/00070

§ 371 (c)(1),
(2), (4) Date: Sep. 30, 2003

(87) PCT Pub. No.: WO02/065166

PCT Pub. Date: Aug. 22, 2002

(65) Prior Publication Data

US 2004/0066548 A1 Apr. 8, 2004

(30) Foreign Application Priority Data

Feb. 9, 2001 (DE) .......................................... 101 05 957

(51) Int. Cl.[7] .............................................. G02B 5/32
(52) U.S. Cl. .......................... 359/15; 359/900; 359/12; 359/28; 359/30
(58) Field of Search .............................. 359/15, 9–12, 359/19, 28, 30, 1, 900

(56) References Cited

U.S. PATENT DOCUMENTS

| 3,708,217 A | 1/1973 | McMahon |
| 4,602,843 A | 7/1986 | Glaser-Inbari |
| 5,071,208 A | * 12/1991 | Chang .......................... 359/10 |
| 5,365,354 A | * 11/1994 | Jannson et al. ............... 359/15 |

FOREIGN PATENT DOCUMENTS

| JP | 2000-214311 | 8/2000 |
| JP | 2000-241888 | 9/2000 |

OTHER PUBLICATIONS

Takashi Mizobuchi, Light Diffusing Sheet And Reflection Liquid Crystal Device Using The Same, Patent Abstracts of Japan, vol. 2000, No. 11, Jan. 3, 2001 and JP 2000–214311A, Aug. 4, 2000, Toppan Printing Co. Ltd.

Masahiro Shiozawa et al, Hologram Screen And Its Production, Patent Abstracts of Japan, vol. 2000, No. 12, Jan. 3, 2001 and JP 2000–241888 A, Sep. 8, 2000, Denso Corp.; Nippon Soken Inc.

* cited by examiner

Primary Examiner—Fayez Assaf
(74) Attorney, Agent, or Firm—Breiner & Breiner, L.L.C.

(57) ABSTRACT

The present invention relates to a method for producing light-scattering elements by holographic illumination of a layer (10) of a photo-sensitive material on a support plate (1) and subsequent development of the layer (10) in order to generating a surface structure. The method is distinguished in that the illumination occurs using at least two mutually coherent luminous beams (2,3) which have passed through one or a plurality of primary diffusers (8,9) respectively were reflected at one or a plurality of primary diffusers, the luminous beams (2,3) being irradiated from different directions and being at least partially superimposed on the layer (10) while forming an interference pattern. This method permits producing diffusers having a leveled scatter profile in a simple manner.

12 Claims, 4 Drawing Sheets

METHOD FOR PRODUCING LIGHT SCATTERING ELEMENTS

BACKGROUND OF THE INVENTION

1. Field of the Invention

The present invention relates to a method for producing light-scattering elements or an impression template therefor by holographically illuminating a layer of a photosensitive material on a support plate and subsequently developing this layer in order to generate a surface structure.

Light-scattering elements, such as are produced with the present method, are used, in particular, for visualizing images or sequences of images in projection technology. Light-scattering elements in the form of ground glass screens onto which an image is projected are employed in many image representation systems. The image-generating light impinging on the ground glass screen is scattered by it, thus deflected in different directions. This scattering permits recognizing the image projected on the ground glass screen from different directions. For example, scatter screens or respectively ground glass screens are used, for instance, in 35 mm reflex cameras or in medium-size cameras. Rear-projection or front projection systems also require a light-scattering element in the form of a large-size projection picture screen or a ground glass screen onto which the image is projected. The light field leaving the projection screen respectively the ground glass screen is diffuse due to the light scattering thus these light-scattering elements are also called diffusers A diffuser can either be operated in transmission, for example in rear projection systems or in reflection, for example in front projection systems. In the present patent application, a plate-shaped element respectively a screen composed of a material that scatters the directed incident luminous beam by volume scattering or surface scattering is called a diffuser.

An essential characteristic of diffusers is their scatter profile which shows the angle-resolved scattering efficiency when the incident luminous beam is collimated perpendicular on the diffuser. Scattering efficiency is defined as the relative intensity of the scattering beam measured at a certain angle of emersion normed to the intensity measured at an angle of emersion respectively an angle of view 0. An entire two-dimensional scatter profile comprises the scattering efficiency of the entire half space. Usually, a diffuser can be sufficiently characterized by two one-dimensional scatter profiles in horizontal direction, respectively x-direction and in vertical direction respectively y-direction. A diffuser whose x-scatter profile and y-scatter profile are almost identical is called a symmetrical diffuser. If the x-direction and the y-direction scatter profiles vary greatly, the diffuser is an asymmetrical diffuser.

The scatter profile of a diffuser must be adapted to the intended application. The geometric conditions and the intended optical effect yield a specific viewing angle range for each application. Thus, for large-size projecting screens an asymmetric viewing angle range respectively scattering angle range is usually required in which the horizontal viewing angle should be larger than the vertical viewing angle.

In the ideal case, the scatter profile of a diffuser comprises a rectangular function. In this case, the image inside the specific viewing angle range is always illuminated homogeneously and uniformly bright. On the other hand, no radiation is lost due to scattering in the angle outside the viewing angle range.

However, the diffusers employed in practice usually do not have a rectangular scatter profile but rather a gaussian one. Yet for most applications, it is desirable to be able to produce diffusers with as level as possible scatter profiles, which in the ideal case would come closer to a rectangular profile.

2. Description of the Prior Art

There are various prior art methods of producing diffusers. For instance diffusers, whose function is based on surface scattering, can be provided with a scattering surface structure by treating the surface mechanically, such as for example by sand blasting or by chemical treatment of the surface, for example by means of an etching process. However, these methods usually only permit producing symmetrical diffusers with a gaussian scatter profile. There is no known reliable possible way of selectively influencing the scatter profile.

A possible state-of-the art manner of cost-effective mass production of suited surface structures for the production of diffusers is using moldable materials, such as for example polymers, in conjunction with a replication process. In the replication, using a correspondingly structured impression template, a surface structure is impressed on the polymer body yielding the scattering behavior.

Any desired surface processing method, including the ones described above, can be employed for producing the impression template, which needs to be produced only once. A prerequisite for moldability is that there is no undercutting in the surface structure.

Among other things, the impression template can be produced by illuminating a photoresist layer with a scattered light field and subsequently developing the photoresist layer. The resulting photoresist structure is then transferred to the impression template, for example by means of galvanic molding. The diffusers produced by this method in conjunction with the impression methods reproduce the scatter profile of the irradiated (scattered) light field generated, for its part, with the aid of a diffuser, referred to as the primary diffuser hereinafter. The width of the resulting scatter profile depends on the geometry of the setup. However, the shape of the scatter profile of the produced diffuser depends on the scatter profile of the primary diffuser and is again usually almost gaussian.

State of the art for generating asymmetrical diffusers are, in particular, volume-holography-based illumination methods with which a refraction index modulation is generated in the volume of a light-sensitive layer. The diffusers produced therewith work according to the volume scattering principle.

U.S. Pat. No. 5,365,354 describes a process for producing asymmetrical diffusers in which a light field is passed through a primary diffuser and radiated in a light-sensitive material. A volume hologram is recorded by radiation of the light-sensitive material. With renewed radiation with light, the volume hologram for its part has a scattering effect due to the reconstruction of the recorded primary diffuser. In a further embodiment of the method, two diffuse luminous beams are irradiated from various directions to produce a so-called multiplex diffuser. In a multiplex diffuser, diffusion behavior varies in the different directions, because at a certain angle of incidence only the hologram of one luminous beam is reconstructed and the hologram of the other luminous beam is reconstructed at another angle of incidence. Such a type method is only possible by creating volume holograms and requires that the two wave fields of the two luminous beams are not mutually coherent. However, the method of U.S. Pat. No. 5,365,354 usually leads to gaussian or almost gaussian scatter profiles, because the shape of the scatter profile of the primary diffuser employed in the illumination setup is duplicated.

U.S. Pat. No. 3,708,217 also describes a method for recording a volume hologram for producing asymmetrical diffusers. In this method, an object wave, which was passed through a primary diffuser, is superimposed with a reference wave on a light-sensitive layer to produce a volume hologram. Suited spatial disposal of the primary diffuser in relation to the light-sensitive layer permits generating a strong direction-dependent scatter profile. However, the use of a planar reference wave results in the optical transfer function of the volume hologram having a strongly periodic part, which can lead to undesirable color effects when employing the diffuser. Furthermore, no solution is offered in this printed publication with which a level as possible scatter profile can be realized.

D. J. Schertler et al's Applied Optics 38 No. 2, 1999, pages 291–303 describes a method for generating a leveled scatter profile in which a combination of a one-dimensional phase diffraction grid is employed with a symmetrically scattering diffuser. These two components can either be disposed in series as single components or constructed in the form of the two surfaces of a transparent support material. The diffuser surface is generated using an etching method and the grid surface is generated using a photoresist method. Providing such a type diffuser is, however, very complicated and expensive due to the necessity of producing two components respectively two differently shaped surfaces. Furthermore, often undesirable color effects occur when irradiating white light due to the strictly periodic diffraction grid.

Based on this state of the art, the object of the present invention is to provide a simple method for producing a light-scattering element respectively a diffuser with which a leveled scatter profile can be obtained at least in one dimension.

SUMMARY OF THE INVENTION

This object is solved using the method according to claim 1. Advantageous preferred embodiments of the method are the subject matter of the subclaims.

In the present method, a surface structure is generated by holographic illumination of a layer of a photosensitive material on a support plate and subsequent development of this material. This surface structure can be utilized either directly as a diffuser or as the starting structure for generating a template for producing a diffuser. An element of the present invention is that illumination of the layer occurs with at least two mutually coherent luminous beams which have passed through one or through a multiplicity of diffusers respectively were reflected at one or at a multiplicity of reflecting diffusers, these luminous beams being irradiated from different directions and being at least partially superimposed, forming an interference pattern on the layer.

Preferably, one primary diffuser is positioned in each beam path of the at least two luminous beams. However, a luminous beam which has passed through a primary diffuser can also be split into two partial beams and the photosensitive material can be illuminated therewith.

In this instance, suited scattering screens having a gaussian scatter profile or another scatter profile can be used as the primary diffusers. Superimposing the two scattered luminous beams and forming an interference pattern on the photosensitive layer results, in an advantageous manner, in a leveling of the scatter profile of the diffuser produced therewith.

This scatter profile can be influenced by special selection of the primary diffusers, by variation of the angle of incidence of the luminous beams or by the use of additional coherent luminous beams, which, if need be, can be also passed through primary diffusers. Of course, further luminous beams which are not coherent to the other luminous beams can also be utilized to achieve in this manner, if need be, special scattering effects.

Depending on the desired scatter profile, both divergent, almost parallel and even convergent luminous beams can be employed for superimposition on the light-sensitive layer. In this case, preferably a photoresist, which has the desired surface relief after developing, is utilized as the light-sensitive layer. This surface relief can then be copied into a support plate, for example composed of glass, located under the surface relief by means of a suited etching technique. Preferably, the surface relief of the photoresist structure is copied into a suited material which then serves as the impression template for the actual generation of diffusers. Molding technology, such as galvanic molding in nickel, can be employed for this purpose. With the impression template generated in this manner, the screens made of a impressionable material, such as for example a polymer, can then be impressed to obtain the desired surface structure and therefore the desired scatter profile of the polymer screens. Such type replication techniques are familiar to someone skilled in the art so that the present patent application does not need to dwell on it.

BRIEF DESCRIPTION OF THE DRAWINGS

The present method is briefly explained in the following using a preferred embodiment in conjunction with the accompanying drawings without the intention of limiting the overall inventive idea.

WAYS TO CARRY OUT THE INVENTION

The present method utilizes holography technology for producing surface reliefs by holographically illuminating a suitable photo-sensitive material on a support plate, hereinafter referred to as a photo plate, the material forming a surface relief in a subsequent etching process in dependence on the illumination in order to produce a diffuser with a leveled scatter profile. The illuminated photo-sensitive material is then developed in order to generate a surface relief that is immediately suited as a diffuser or can be used by means of copying as an impression template for a diffuser. With the method, an interference field is generated on the photo-sensitive material by superimposing the at least two mutually coherent luminous beams passed through at least one primary diffuser respectively reflected at at least one primary diffuser and converted into a surface modulation by a developing step.

Figure 1:
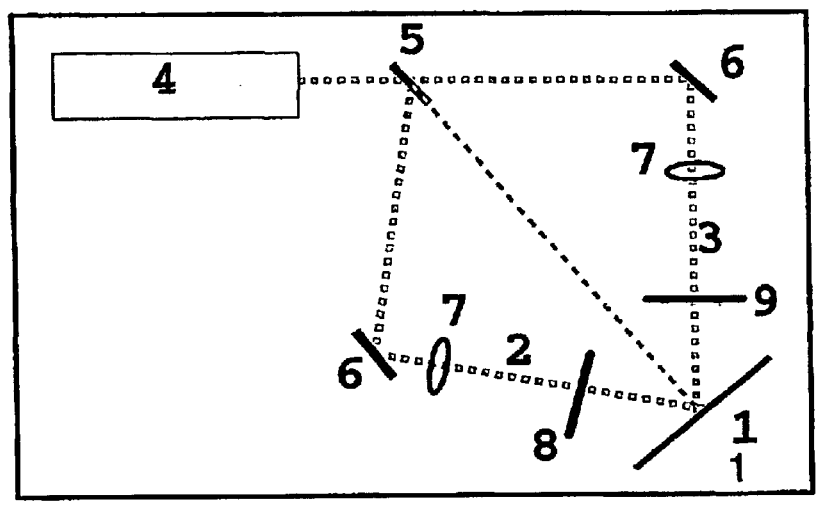
FIG. 1 shows a possible setup for generating the surface hologram according to the present method.

FIG. 1 shows an example of an arrangement for illuminating the not discernable photosensitive layer on a photo plate 1 by superimposing the two luminous beams 2 and 3. The two luminous beams 2 and 3 are generated by a laser 4 with a downstream beam splitter 5 and are directed via a beam deflection element 6 and beam-shaping elements 7, such as for example lenses, through two primary diffusers 8, 9 onto photo plate 1. Suited illumination times, usually lying in the minute range depending on the photoresist used, are known to someone skilled in the art. In the present example, the two luminous beams 2 and 3 strike the photo plate expanded.

After illumination and development of the photoresist layer on the photo plate 1, the surface structure is transferred onto a nickel plate or nickel foil by means of galvanic molding. The plate then serves as the impression template for the polymer foils respectively polymer plates forming the diffusers after the impression step. In this method, surface structures are usually larger than the wavelengths at which the diffusers are employed.

Figure 2:
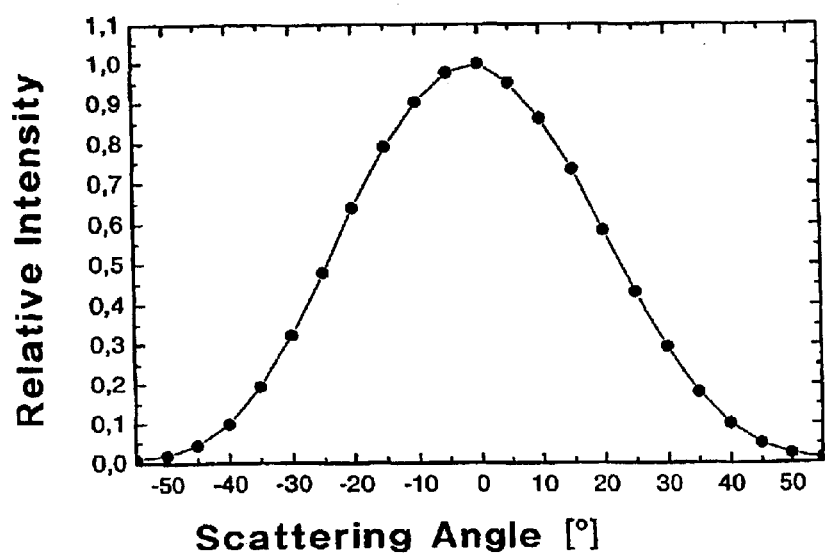
FIG. 2 shows a scatter profile of a conventional diffuser having gaussian distribution.

FIG. 2 shows an example of a scatter profile of a diffuser produced using volume holography technology by illumination of a beam that has passed through a primary diffuser. Such a gaussian scatter profile occurs with most diffusers depending on the mode of production.

Figure 3:
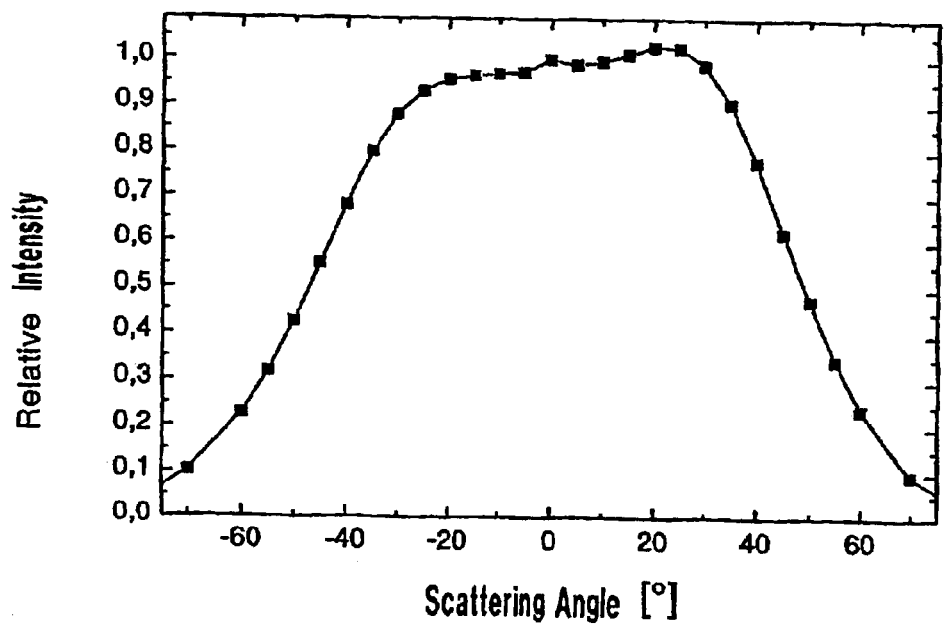
FIG. 3 shows two exemplary profiles of diffusers produced with the present method.
Figure 3:
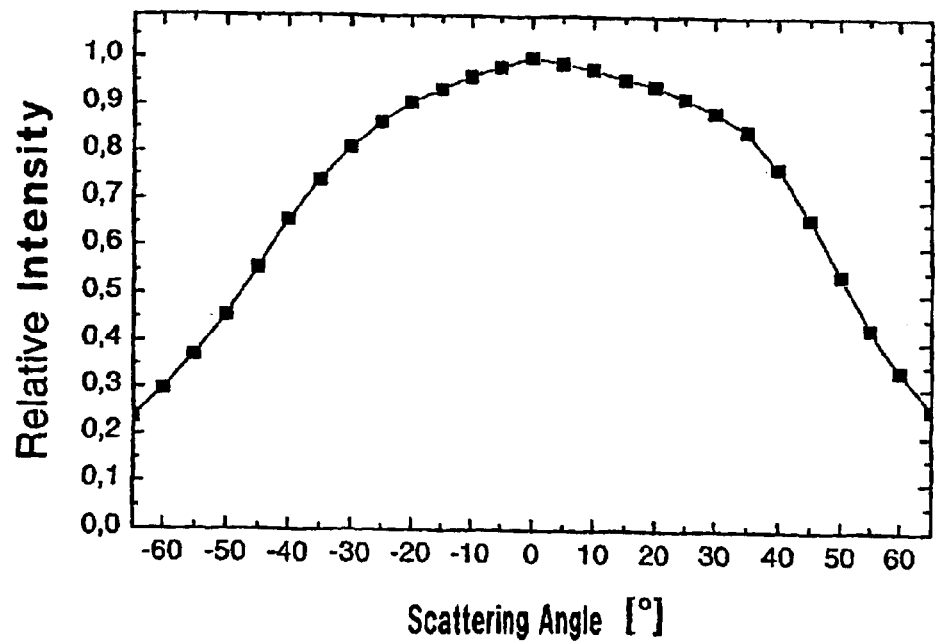
Figure 4:
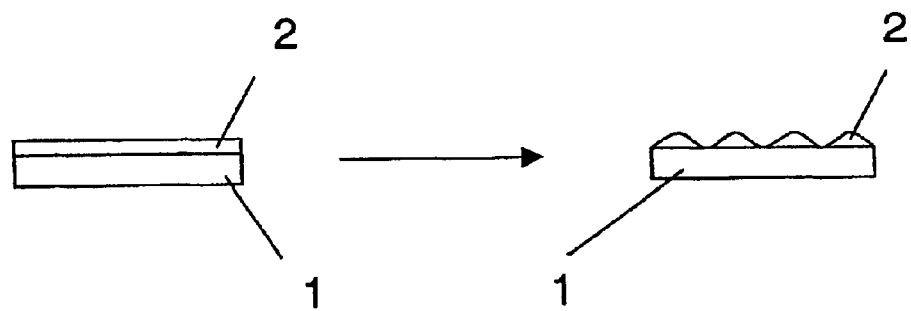
FIG. 4 shows greatly simplified a support plate (1) with the layer (10) located thereupon before and after development of the layer (10)
Figure 5:
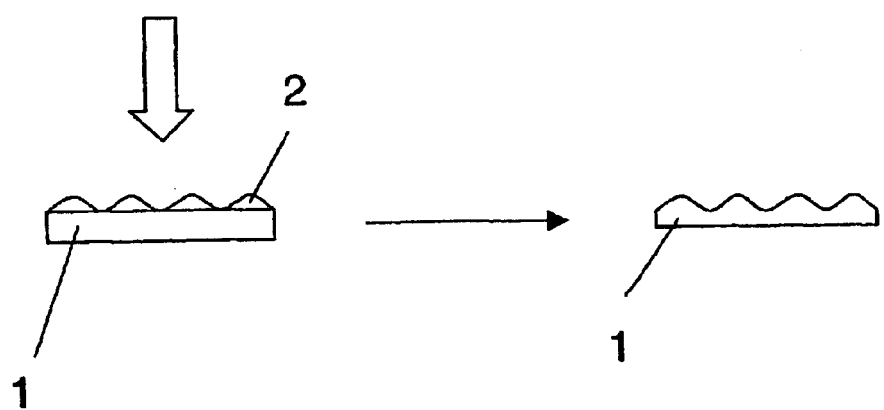
FIG. 5 shows schematically the transfer of the surface structure of the layer (10) to the support plate (1) by means of an etching process.
Figure 6:
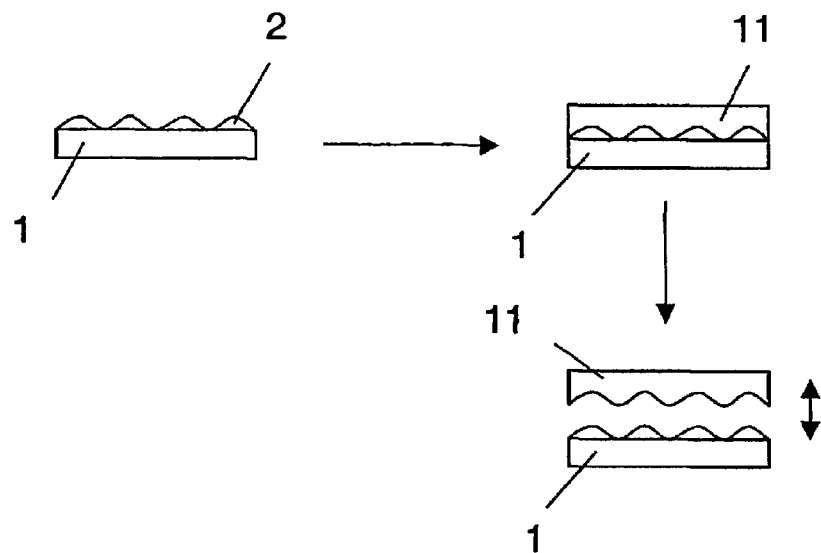
FIG. 6 shows schematically the transfer of the surface structure by means of an impression process to an template (11), which serves as the impression template for impressing the surface of light-scattering elements.
Figure 7:
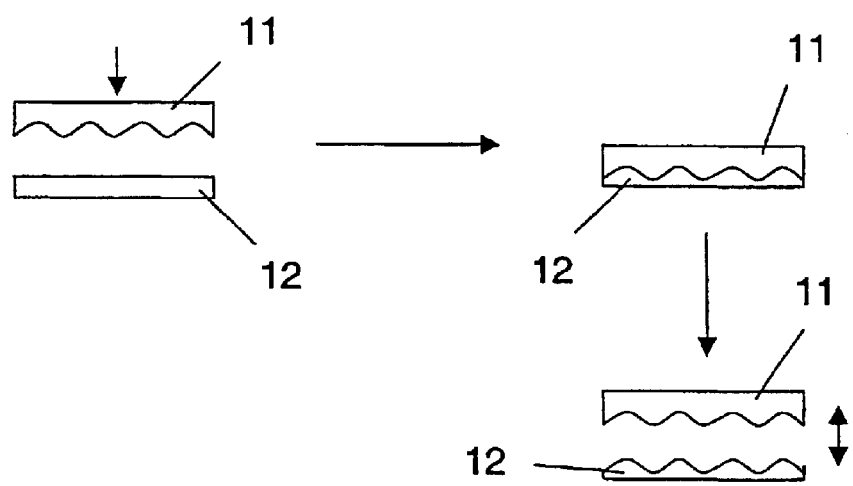
FIG. 7 shows schematically the impression of the surface of plates or foils (12) composed of an impressionable material using the impression template to generate light-scattering elements.

In contrast thereto, FIG. 3 shows two examples of one-dimensional scatter profiles of diffusers produced using the present method. The graphs distinctly show the leveled course of the angle-dependent scattering efficiency compared to the gaussian profile.

With the symmetrical diffusers it is usually useful to level the profile in both directions. However, with asymmetrical diffusers the desired application may require, for instance when used as a projection screen, optimizing only one of the two scatter profiles.

Leveling of the scatter profile in both dimensions can be realized with the present method, for example, in that illumination is carried out in several steps and the photo plate is turned between the two illuminations.

LIST OF REFERENCES 1 support plate respectively photo plate
2,3 coherent luminous beams
4 laser
5 beam splitter
6 beam-deflection elements
7 beam-shaping elements
8,9 primary diffusers
10 layer of a photo-sensitive material
11 template
12 plate respectively foil of an impressionable material

What is claimed is:

1. A method for producing light-scattering elements or an impression template therefor by holographic illumination of a layer of a photosensitive material on a support plate and subsequent development of said layer in order to generate a surface structure, comprising providing illumination by means of at least two mutually coherent luminous beams which are irradiated from different directions and which are at least partially superimposed on said layer while forming an interference pattern, wherein said at least two luminous beams pass through one or a plurality of primary diffusers respectively and are reflected at one or a plurality of primary diffusers before said at least two luminous beams are superimposed on said layer while forming the interference pattern.

2. A method according to claim 1, wherein said photosensitive material is a photoresist.

3. A method according to claim 1 or 2, further comprising transferring the surface structure to said support plate by means of a subsequent etching process.

4. A method according to claim 1 or 2, further comprising transferring the surface structure to a template by means of a subsequent copying process, said template serving as an impression template for impressing a surface of light-scattering elements.

5. A method according to claim 4, wherein the template is a plate or a foil composed of metal and said transferring is by means of a galvanic molding process.

6. A method according to claim 5, wherein at least one surface of said plate or foil is composed of impressionable material and wherein a layer of the impressionable material is applied on a support plate and impressed in order to generate light-scattering elements.

7. A method according to claim 1, wherein said at least two mutually coherent luminous beams are generated by a laser whose initial beam is split into said at least two luminous beams.

8. A method according to claim 7, wherein a primary diffuser is positioned in a path of the initial beam.

9. A method according to claim 7, wherein following splitting of the initial beam, at least one primary diffuser is positioned in each path of said at least two luminous beams.

10. A method according to claim 8 or 9, wherein each said primary diffuser has an approximately gaussian scatter profile.

11. A method according to claim 1 further comprising employing at least one additional luminous beam for illuminating said layer, said at least one additional luminous beam not being coherent to said at least two mutually coherent luminous beams.

12. A method according to claim 1, wherein said light-scattering elements are diffusers in a holographic method for producing surface diffusers.

* * * * *